United States Patent
Duvernell et al.

(10) Patent No.: US 7,256,703 B2
(45) Date of Patent: Aug. 14, 2007

(54) ZONE SPECIFIC REMOTE CONTROL PANEL FOR LOADING DOCK EQUIPMENT

(75) Inventors: Kim Duvernell, Brown Deer, WI (US); Terence Reynard, London (CA); James C. Alexander, Coppell, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 63 days.

(21) Appl. No.: 10/918,352

(22) Filed: Aug. 16, 2004

(65) Prior Publication Data

US 2005/0102041 A1    May 12, 2005

Related U.S. Application Data

(63) Continuation-in-part of application No. 10/124,594, filed on Apr. 18, 2002, now Pat. No. 6,781,516, which is a continuation-in-part of application No. 10/124,593, filed on Apr. 18, 2002, now Pat. No. 6,975,226.

(51) Int. Cl.
*G08B 3/00* (2006.01)
(52) U.S. Cl. .................... 340/691.1; 340/539.1; 340/539.23; 340/686.6
(58) Field of Classification Search ............ 340/691.1, 340/539.1, 539.23, 686.6
See application file for complete search history.

(56) References Cited

U.S. PATENT DOCUMENTS

| | | | |
|---|---|---|---|
| 4,692,755 A | 9/1987 | Hahn | 340/687 |
| 4,843,373 A | 6/1989 | Trickle et al. | 340/540 |
| 5,007,211 A | 4/1991 | Ouellet | 52/2.12 |
| 5,208,753 A * | 5/1993 | Acuff | 701/50 |
| 5,452,489 A | 9/1995 | Gelder et al. | 14/69.5 |
| 5,682,379 A * | 10/1997 | Mahany et al. | 370/311 |
| 5,803,701 A | 9/1998 | Filiberti et al. | 700/215 |
| 5,831,540 A | 11/1998 | Sullivan | 340/679 |
| 6,329,931 B1 | 12/2001 | Gunton et al. | 340/933 |
| 6,359,872 B1 * | 3/2002 | Mahany et al. | 370/338 |

FOREIGN PATENT DOCUMENTS

| | | |
|---|---|---|
| WO | 2006/066013 | 6/2006 |
| WO | 2006/076538 | 7/2006 |

\* cited by examiner

*Primary Examiner*—Daryl C Pope
(74) *Attorney, Agent, or Firm*—Baker & Hostetler LLP

(57) ABSTRACT

A loading dock apparatus remote control is provided. Some embodiments of the invention include a zone specific remote control for loading dock apparatus. Some optional embodiments include a selector switch to select which apparatus the single set of controls will control. Other optional embodiments automatically select the apparatus to be controlled by the single set of controls. A method of operating loading dock apparatus using a remote control is also provided.

23 Claims, 12 Drawing Sheets

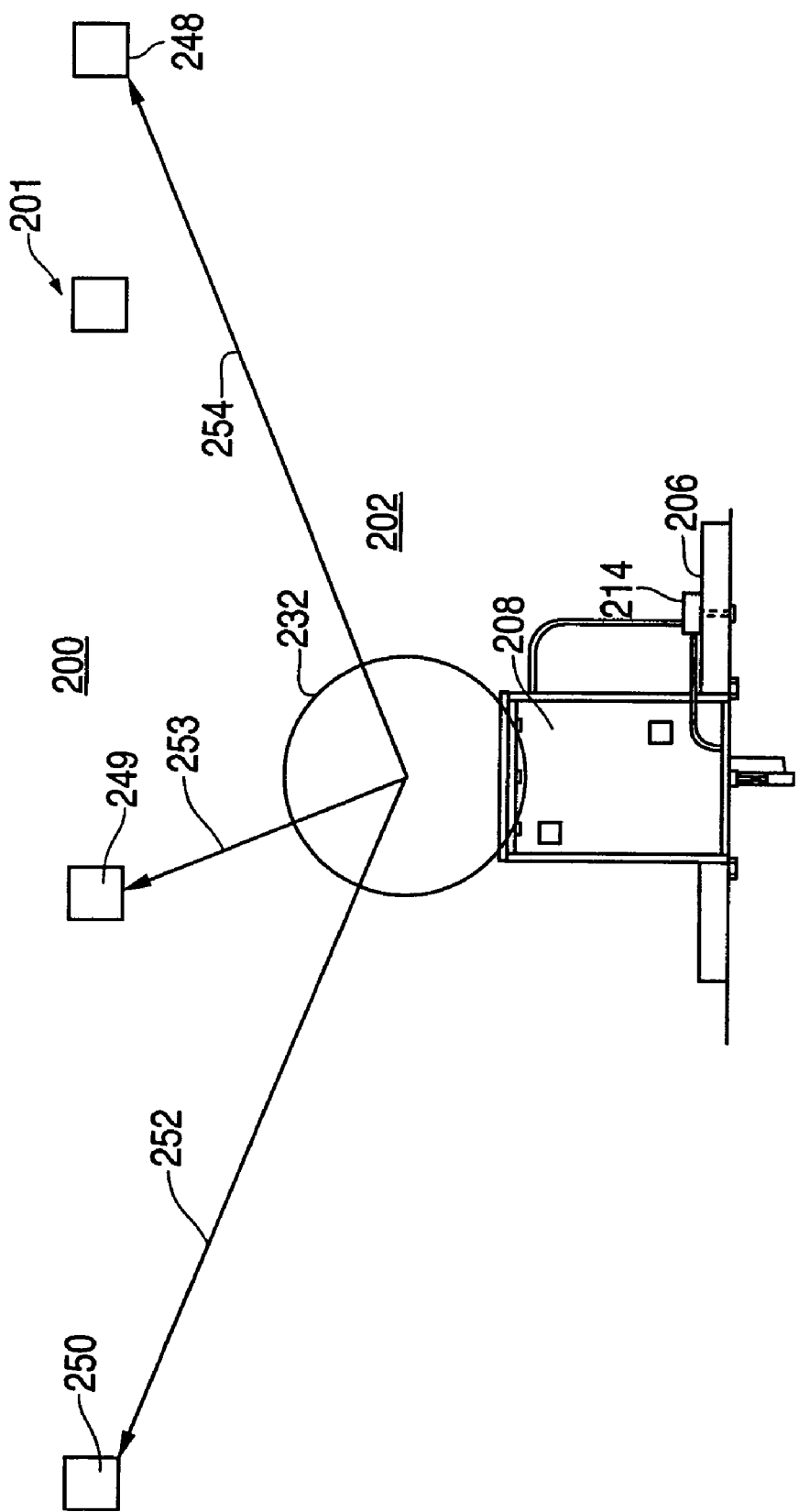

ZONE SPECIFIC REMOTE CONTROL PANEL FOR LOADING DOCK EQUIPMENT

CROSS-REFERENCE TO RELATED APPLICATIONS

This application claims priority to and is a continuation-in-part of two U.S. patent applications both entitled Master Control Panel for Loading Dock Equipment, both filed Apr. 18, 2002, having Ser. Nos. 10/124,594 (now U.S. Pat. No. 6,781,516) and Ser. No. 10/124,593 (now U.S. Pat. No. 6,975,226), the disclosures of which are hereby incorporated by reference in their entirety.

FIELD OF THE INVENTION

The present invention relates generally to control panels for loading dock equipment. More particularly, the present invention relates to a zone specific remotely operated control panel for operating loading dock equipment.

BACKGROUND OF THE INVENTION

Some embodiments of the invention are directed to a master control panel which simplifies the operation of loading dock equipment. In addition to having a dock leveler and overhead door, a loading dock may also have a vehicle restraint, loading light, barrier gate and inflatable shelter. If the various devices are power operated rather than manually operated, the wall beside the doorway may be cluttered with various control panels. Not only is the space between doors often very restricted, but the cost of the electrical installation can be significant. This situation can be improved with the installation of a combination control panel which includes all of the controls in a single enclosure. The combination panel not only saves space but may also reduce the cost of electrical installation. One criticism of existing combination panels has been that the operator may be confused by the various number of switches and push buttons, and the proper sequence of operation.

DESCRIPTION OF RELATED ART

FIG. 1 illustrates a loading dock with a driveway 1, dock face 2, dock floor 3. A pit 4 is recessed in the floor 3. A dock leveler assembly 10 has a deck assembly 11, and a frame assembly 12 which is mounted in the pit 4. Lip keepers 14 are mounted to the front of the frame. The rear of a deck assembly 11 pivots on the frame assembly 12 and has a lip hinge 13 at the front. In the storage position, a lip assembly 15 is supported at one end by the lip hinge 13 and has the other end resting on the lip keepers 14.

The doorway of the loading dock can be closed by a movable door 18, shown partially open. A vehicle restraint assembly 20 is mounted to the dock face 2 and has a hook 21, which moves vertically to engage the RIG of a truck or tractor trailer (not shown). A light assembly 23 is mounted beside the doorway and has a red light 24 and a green light 25 to signal the truck driver. Two signs 26 and 27 instruct the driver to move only when the green light is illuminated. The sign 26 has reversed lettering to be legible when viewed in the truck mirror. A loading light 28 is mounted beside the doorway to illuminate the interior of the trailer during loading. A barrier gate assembly 30 has a barrier arm 31 which moves from a horizontal position where it prevents access to the doorway to a vertical position where it allows access to the doorway.

An inflatable shelter assembly 35 has two side bags 36 and a head bag 37 which are inflated by a motor and blower (not shown). When a truck or trailer is at the dock, the bags inflate to form a seal between the truck or trailer and the dock wall.

FIG. 2 demonstrates a typical loading dock area with control panels for a hydraulic dock leveler, electric vehicle restraint and power operated door. The dock leveler control panel 40 has three buttons, button 41 raises the dock leveler deck assembly 11, button 42 extends the hinged lip plate 15, and button 43 is an Emergency Stop which stops all of the dock leveler functions. The vehicle restraint control panel 50 has a selector switch 51, an engage button 52 and a release button 53. Three lights 55, 56 and 57 which are red, amber and green respectively, indicate to the dock operator the status of the vehicle restraint. The selector switch 51 has three positions, Off, On, and Lights Only, which allows the operator to bypass the vehicle restraint if the truck or trailer cannot be captured by the vehicle restraint and must be restrained by wheel chocks. The door control panel 60 has three buttons, an Open button 61, a Close button 63 and a Stop button 62.

The normal operating sequence of the equipment is as follows:

When the dock is not in use, the exterior green light 25 is illuminated to indicate that the truck driver may approach or leave the dock. The interior red light 55 is illuminated to indicate that the dock is not in a condition for use. After a trailer backs in to be loaded or unloaded, the operator selects the vehicle restraint control panel 50 and presses the engage button 52. The vehicle restraint hook 21, of FIG. 1, rises to engage the truck or trailer rear impact guard. When the hook 21 starts to rise, the exterior red light 24 is illuminated to indicate that the truck driver cannot leave. When the truck or trailer has been effectively restrained, the interior green light 57 is illuminated to indicate that the dock is ready to use. If the vehicle restraint 20 cannot restrain the trailer, the dock operator must manually chock the truck or trailer wheels. The operator may then turn the selector switch 51 from On (or a normal position) to Lights Only position. Both the interior green light 55 and amber light 56 are now illuminated to indicate that the dock is safe to use, but that the operator should use greater caution because the vehicle restraint 20 has not engaged the truck or trailer.

The operator selects the door control panel 60 and presses the Door Open button 61 to open the door 18.

The operator selects the dock leveler control panel 40 and presses the Raise button 41 to raise the deck assembly 11, extend the lip assembly 15, and releases the button to lower the leveler onto the trailer. Pressing the Lip Extend button 42 allows faster operation by causing the lip 15 to extend before the deck assembly 11 is fully raised. Pressing the Emergency Stop button 43 causes the dock leveler to stop so that it will not descend on top of any misplaced cargo.

If a loading light 28 is installed it may have a manual switch or may be automatically turned on when the door is opened. Similarly, an inflatable shelter 35 may be operated by a manual switch or be automatically turned on when the door is opened.

When the loading operation is finished, the operating sequence is reversed.

The operator presses the dock leveler Raise button 41 to raise the deck assembly 11, fold the lip assembly 15 and then releases the button to lower the dock leveler to the stored position.

The operator presses the Door Close button 63 to close the door 18. Pressing the Stop button 62 causes the door to stop before it closes.

The operator presses the Release button 53 and the vehicle restraint hook 21 lowers to release the trailer. When the hook 21 starts to lower, the interior red light 55 is illuminated to indicate that the dock is not ready for use. When the hook is fully lowered, the exterior green light 25 is illuminated to indicate that the truck driver may leave.

FIG. 3 demonstrates a typical combination control panel with controls for a hydraulic dock leveler, electric vehicle restraint and power operated door. The control buttons and switches have the identical functions of the separate panels in FIG. 2. Often, a Programmable Logic Controller (PLC) is used to allow many different control sequences and interconnect relationships. A PLC accepts input signals from various devices such as limit switches and push buttons and then transmits output signals to various devices such as lights, relays and motors in accordance with the logic defined by the control program. The use of a PLC is well known in the loading dock industry and the specific electrical circuits and program statements are not shown nor discussed herein.

Although the control buttons and switches are arranged in functional groups and are clearly labeled, an untrained operator may find that the number of buttons and their differing locations make the proper sequence of operations seem confusing. Therefore, this invention provides a combination panel with all of the advantages of compact space and economical installation, and with a simplified operating sequence.

Accordingly, it is desirable to provide a simplified combination panel for controlling loading dock equipment and a method for operating loading dock equipment with a simplified control panel.

Another problem associated with loading and unloading of cargo at loading docks involves the inability of a fork truck driver from being able to operate the loading dock equipment while seated on the fork truck. In current systems, a fork truck driver must dismount from the fork truck and operate the loading dock equipment and then return to the fork truck to continue loading or unloading operations. Alternatively, a second person operates the loading dock equipment while the fork truck driver performs loading and unloading operations. The constant getting in and out of the fork truck or the use of a second person to operate the loading dock equipment can be inefficient.

Accordingly it is desirable to provide a system and method to permit a fork truck driver to operate the loading dock equipment while seated on the fork truck.

SUMMARY OF THE INVENTION

It is therefore a feature and advantage of some embodiments of the present invention to provide a combination panel with all of the advantages of compact space and economical installation, but with a simplified operating sequence.

The above mentioned features, and other features and advantages are achieved through the use of a novel master control panel as herein disclosed. In accordance with one embodiment of the present invention, the invention includes a unified controller for controlling a loading dock apparatus comprising a control panel for providing a common area for operator controls and signals; operator signal lights located on the control panel and operatively connected to the loading dock apparatus for signaling an operator that a loading dock is at least one of ready for loading, not ready for loading, and operator be cautioned; a selector switch located on the control panel, and operatively connected to the loading dock apparatus to permit selective operation of a vehicle restraint, a dock door, and a leveler apparatus; a first operation control attached to the control panel wherein the first operation control engages the vehicle restraint when the selector switch is selected to operate the vehicle restraint, the first operation control opens the dock door when the dock door is selected by the selector switch, and the first operation control controls the raising and lowering of the dock leveler to an operative and a stored position, and extends and retracts a lip portion of the dock leveler when the dock leveler is selected by the selector switch; a second operation control attached to the control panel, wherein the second operation control extends a lip portion of the dock leveler when the dock leveler is selected by the selector switch, the second operation control closes the dock door when the dock door is selected by the selector switch, the second operation control disengages the vehicle restraint when the selector switch is selected to operate the vehicle restraint, and; a third operation control attached to the control panel, wherein the third operation control is an emergency stop control configured to stop operation of the loading dock apparatus; operator indicator lights located on the control panel, wherein the indicator lights indicate which of the vehicle restraint, door, and dock lever the operation controls will activate; and a vehicle restraint bypass switch located on the controller, wherein the vehicle restraint bypass switch may selectively bypass the dock loading apparatus causing the first operation control to not engage the vehicle restraint, but activate the operator control signal light to indicate at least one of ready for loading, and operator be cautioned, and the second operation control to not disengage the dock loading apparatus.

In accordance with another embodiment of the present invention, the invention includes a controller for controlling a loading dock apparatus, the apparatus including a vehicle restraint, a door, a loading light, a dock leveler, the controller comprising a control panel for providing a common area for operator controls and signals; operator signal lights located on the control panel and operatively connected to the loading dock apparatus for signaling an operator that a loading dock is at least one of ready for loading, not ready for loading, and operator be cautioned; selector switch located on the control panel, and operatively connected to the loading dock apparatus to permit selective operation of a vehicle restraint, a dock door, and a leveler apparatus; a means for controlling the loading dock apparatus, the means attached to the control panel, wherein the means controls the vehicle restraint when the selector switch is selected to operate a vehicle restraint, the means controls a dock door when the dock door is selected by the selector switch, and the means controls a dock leveler when the dock leveler is selected by the selector switch; an emergency stop control attached to the control panel, configured to stop operation of the loading dock apparatus; operator indicator lights located on the control panel, wherein the indicator lights indicate which of the vehicle restraint, door, and dock lever the operation controls will activate; and a vehicle restraint bypass switch located on the controller, wherein the vehicle restraint bypass switch may selectively bypass the dock loading apparatus causing the means to not control the vehicle restraint, but activate the operator control signal light to indicate at least one of ready for loading, and operator be cautioned, when the vehicle constraint is engaged or bypassed and control signal light to indicate that the dock is not ready for loading when the vehicle restraint is not engaged and not bypassed.

In accordance with another embodiment of the present invention, the invention includes a method of controlling a loading dock apparatus with a single unified controller comprising configuring a first and second operation control to control a dock door by selecting a dock door option with a selecting switch; operating a dock door by operating the first operation control to open the dock door and operating the second operation control to close the dock door; configuring the first and second operation control to operate a dock leveler by selecting a dock leveler option with the selecting switch; operating a dock leveler by raising and lowering a dock leveler by operating the first operation control and extending and retracting a lip portion of the dock leveler and extending a lip portion of the dock leveler by operating the second operation control.

In accordance with another embodiment of the present invention, the invention includes a control panel for a loading dock apparatus comprising; an operator means located on the control panel for operating a loading dock apparatus, a controller means associated with the control panel for causing the operator means to operate at least two of a vehicle restraint, a loading dock door, a loading dock door seal, and a dock leveler and lip in a predetermined sequence, wherein the operator means, when activated, activates the loading dock apparatus to be operated next in a predetermined sequence.

In accordance with another embodiment of the present invention, the invention includes a control panel for a loading dock apparatus comprising; an operator means located on the control panel for operating a loading dock apparatus, a selector means located on the control panel for selection between at least two of a vehicle restraint, a loading dock door, a loading dock door seal, and a dock leveler and lip, wherein the selector means causes the operator means, when activated, to operate the loading dock apparatus that is selected by the selector means.

It is therefore a feature and advantage of some embodiments of the present invention to provide a method and apparatus that permits a fork truck operator operate loading dock equipment from with in a fork truck. Other embodiments of the invention include features and advantages such as operating loading dock equipment associated with several different dock bays with the same equipment but only one bay at a time. Other embodiments of the invention include features and advantages such as a combination panel with all of the advantages of compact space and economical installation, but with a simplified operating sequence and operable from in a fork truck.

In accordance with another embodiment of the present invention, a remote control system is provided. The system comprises: a receiver operatively connected to equipment to be controlled by the system; a remote control configured to communicate with the receiver to control the equipment; a transmitter operatively connected to the remote control; and a zone defined by at least one receiver and remote control wherein the remote control and the receiver communicate with each other when the transmitter is located in the zone and can not communicate with each other when the transmitter is not in the zone; and the zone is not defined by a range associated with the transmitter.

In accordance with another embodiment of the present invention, a loading dock control system is provided. The system comprises: an infrared transmitter attachable to a fork truck and configured to transmit an infra red signal substantially straight up; a remote dock loading equipment controller operatively connected to the transmitter; and a receiver mountable with in a loading dock such that when mounted, the receiver will only be able to receive a signal from the transmitter when the transmitter is located with in a defined zone, the receiver configured to be operatively connected to a control panel located at the loading dock and controlling loading dock equipment.

In accordance with another embodiment of the present invention, a control system is provided. The system comprises: means for transmitting attachable to a fork truck and configured to transmit a signal substantially straight up; equipment controlling means operatively connected to the transmitting means; and receiving means mountable within a loading dock such that when mounted, the receiving means will only be able to receive a signal from the transmitting means when the transmitting means is located within a defined zone, the receiving means configured to be operatively connected to a control panel located at the loading dock and controlling loading dock equipment.

In accordance with another embodiment of the present invention, a method of remotely controlling dock loading equipment is provided. The method comprises operating loading dock equipment with a controller located on a fork truck.

In accordance with another embodiment of the present invention, a remote controller for loading dock apparatus is provided. The remote controller comprises: a signal transmitter configured to transmit a signal wirelessly to a remotely located receiver operatively connected to loading dock apparatus; and at least one actuator operatively connected to the signal transmitter and configured to, when actuated, send a control signal to the signal transmitter for transmission to the receiver to cause loading dock apparatus to function according to the signal.

In accordance with another embodiment of the present invention, a remote controller for loading dock apparatus is provided. The remote controller comprises: means for transmitting a signal configured to transmit a signal wirelessly to a remotely located receiver operatively connected to loading dock apparatus; and means for generating a signal operatively connected to the signal transmitting means and configured to, when actuated, send a control signal to the signal transmitting means for transmission to the receiver to cause loading dock apparatus to function according to the signal.

In accordance with another embodiment of the present invention, a method of remotely operating loading dock equipment is provided. The method comprises: configuring a single controller to operate a plurality of loading dock apparatus; and transmitting a control signal from the controller to a transmitter and transmitting the control signal over a wireless connection from the transmitter to a remote receiver operatively connected to the loading dock equipment.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 15 is a top view of a loading dock with a loading dock equipment control system in accordance with another with the invention where multiple transmitter/receivers are used.

DETAILED DESCRIPTION OF THE PREFERRED EMBODIMENTS OF THE INVENTION

Figure 1:
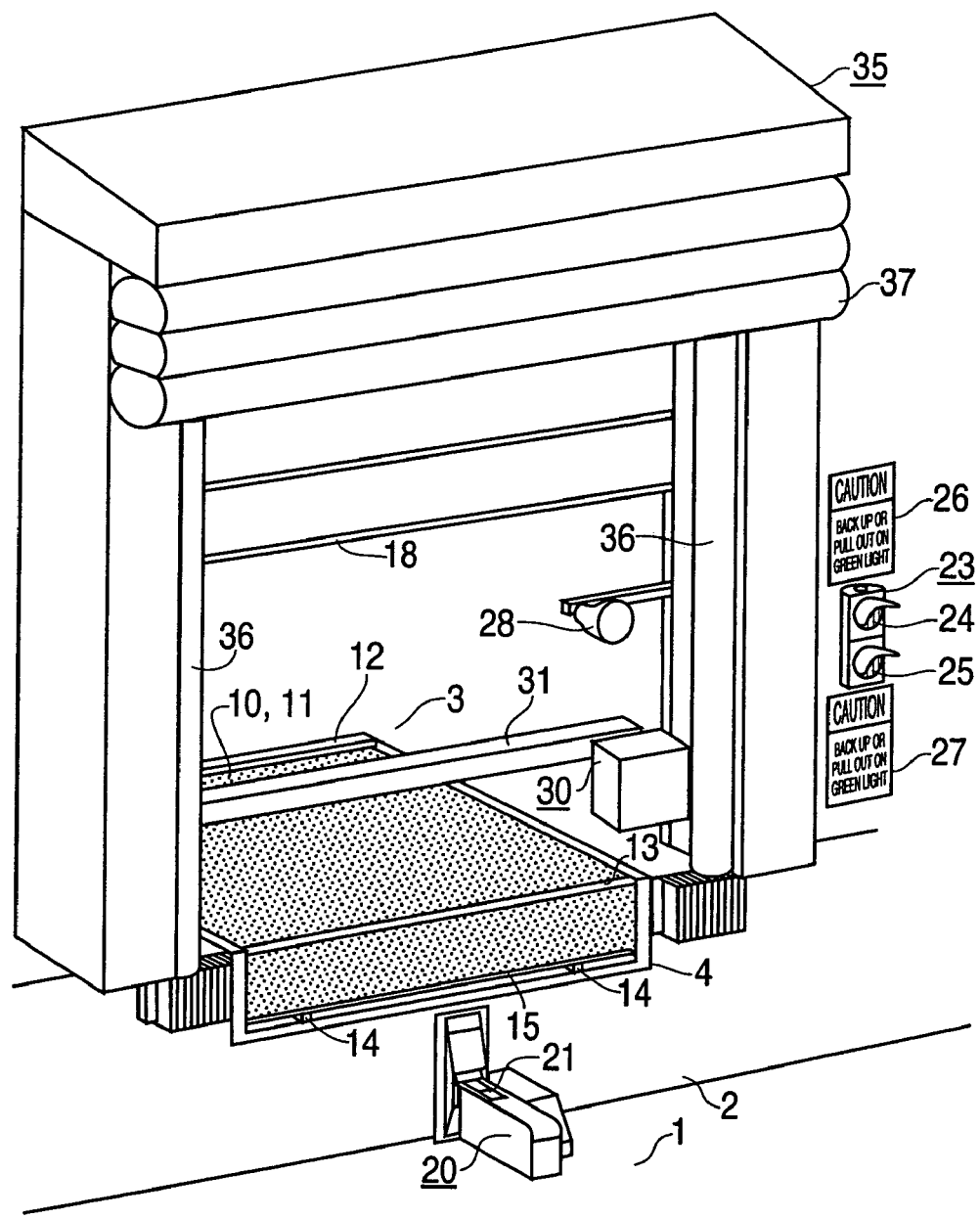
FIG. 1 a perspective view of a loading dock with dock leveler, door, vehicle restraint, barrier gate, loading light and inflatable shelter.
Figure 2:
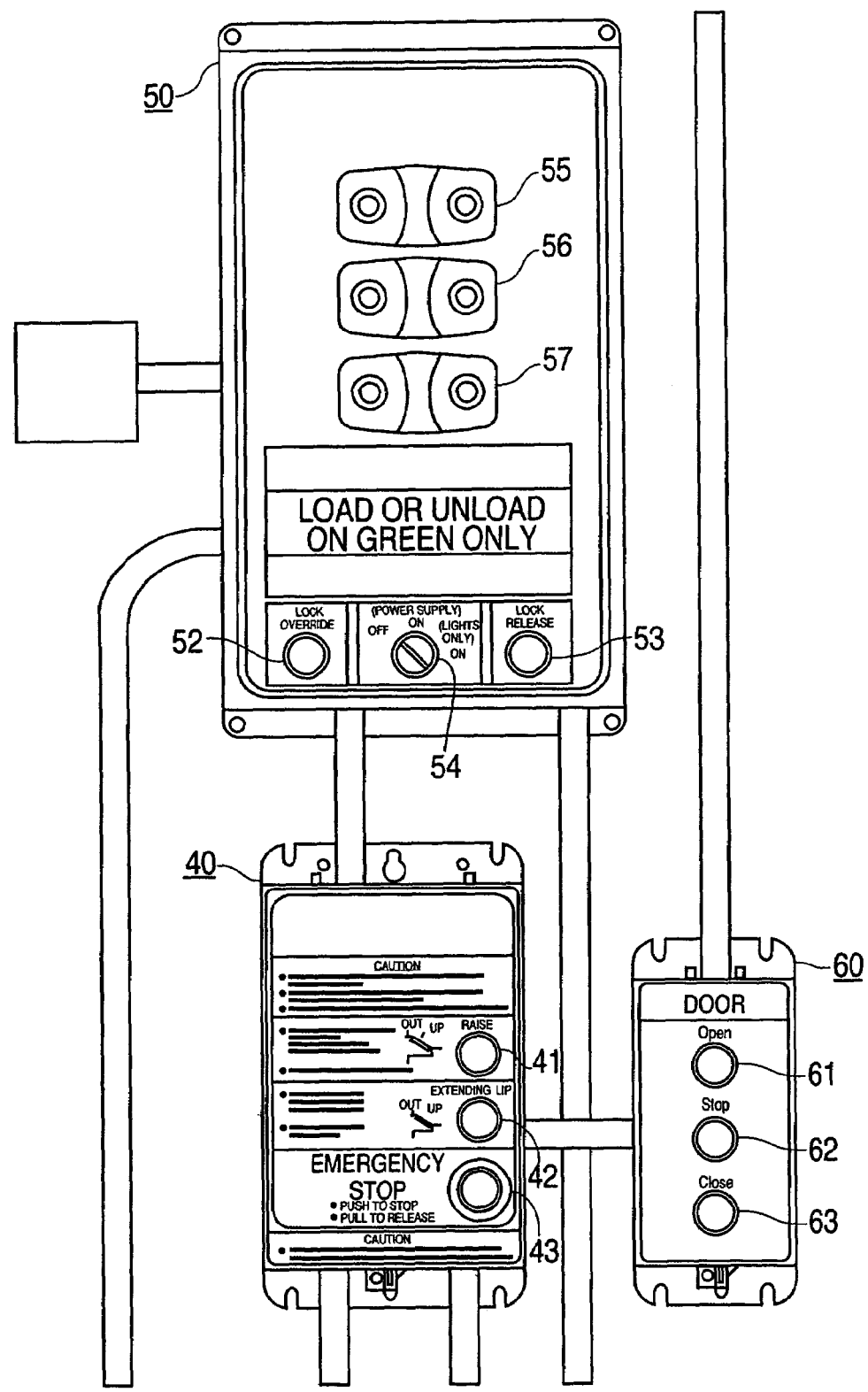
FIG. 2 is a front view of a typical dock wall with multiple control panels.
Figure 3:
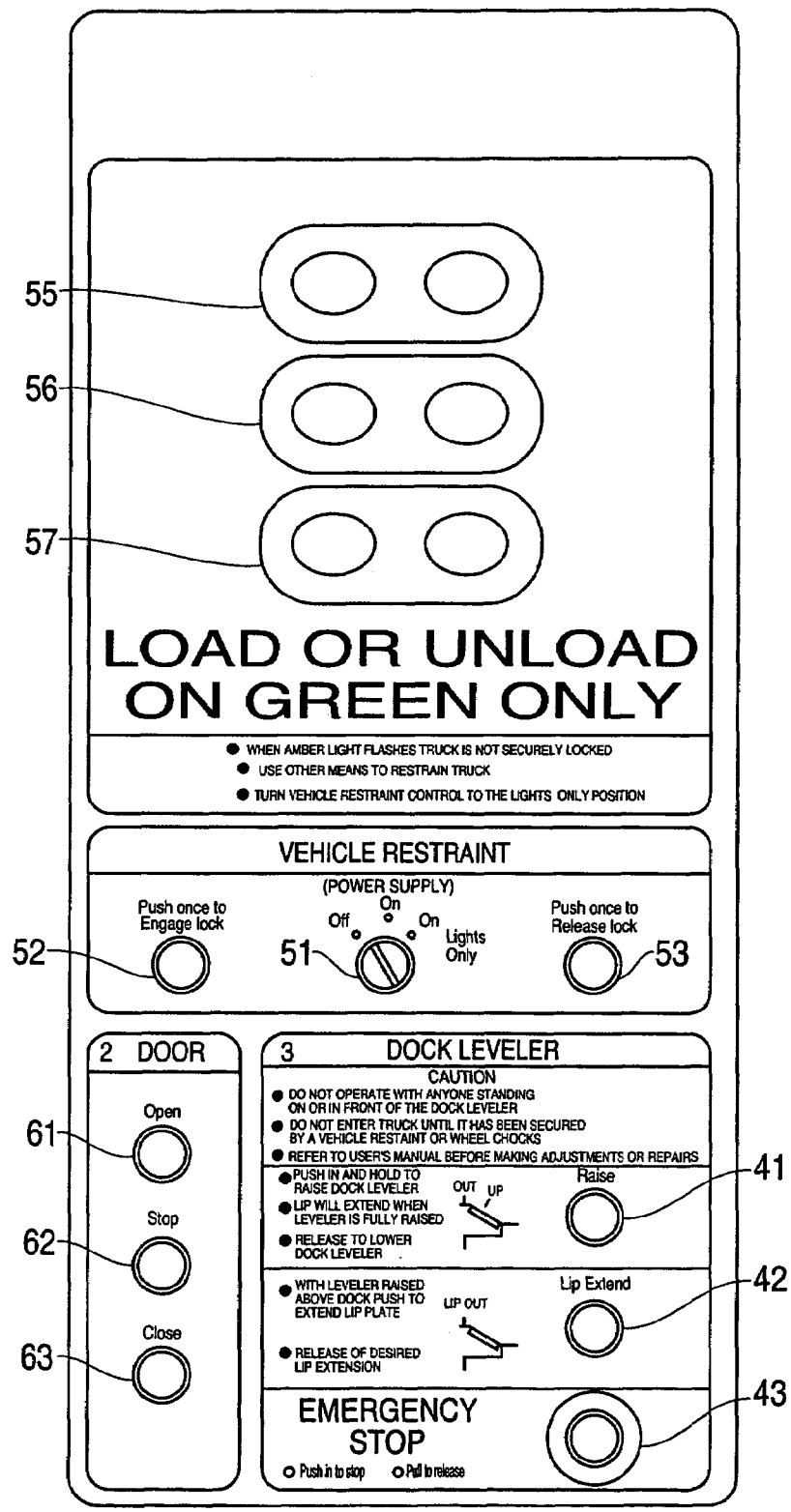
FIG. 3 is a front view of combination control panel having multiple controls for different pieces of equipment.
Figure 4:
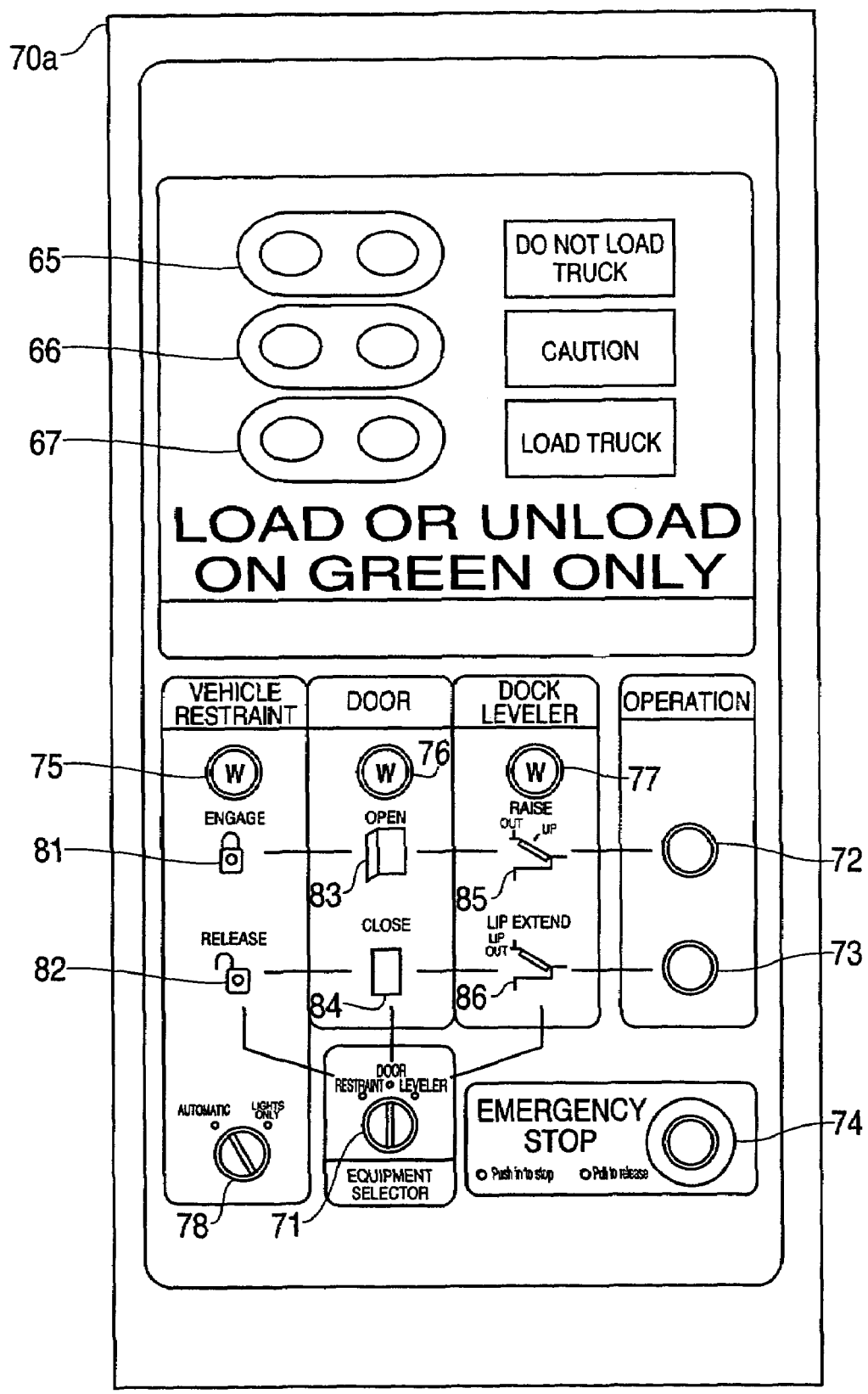
FIG. 4 is a front view of one optional embodiment of a combination control panel in accordance with the invention with a simplified operating sequence.

In accordance with a first optional embodiment of the invention, FIG. 4 shows a control panel 70a which operates a hydraulic dock leveler 10, FIG. 1, vehicle restraint 20 and power operated door 18. The panel has a selector switch 71 with three positions, Restraint, Door, Dock Leveler, push buttons 72, 73 and 74, (which may be referred to as operation controls, in other embodiments the operation controls may include other types of operation controls than push buttons such as levers, switches, turn key operators or other common input devices) and three indicator lights 75, 76, 77. An array of 6 operating symbols 81 through 86 indicate the operational functions of each button. Three lights 65, 66 and 67 (which may be referred to as operator signal lights) which are red, amber and green respectively, indicate to the dock operator the status of the vehicle restraint. A selector switch 78 provides an bypass for the vehicle restraint 20 similar to the Lights Only position of the selector switch 51 on the conventional vehicle restraint control panel 50.

The normal operating sequence of the dock equipment is in the same order as described above, but there are fewer control buttons and the operation sequence is presented in a more logical sequence. The interior lights 65, 66 and 67, and the exterior lights 24 and 25 have the same functions for all of the control panels in this application and will not be described again.

The operator turns the selector switch 71 to Restraint. The indicator light 75 is illuminated to indicate that the symbols for the vehicle restraint, 81 and 82 in the first column, are in effect.

The operator presses the button 72 to cause the vehicle restraint hook 21 to rise and engage the truck or trailer.

The operator turns the selector switch 71 to Door. The indicator light 76 is illuminated to indicate that the symbols for the door, 83 and 84 in the second column, are in effect.

The operator presses the button 72 to open the door 18.

The operator turns the selector switch 71 to Dock Leveler. The indicator light 77 is illuminated to indicate that the symbols for the dock leveler, 85 and 86 in the third column, are in effect.

The operator presses the button 72 to raise the deck assembly 11, extend the lip assembly 15, and releases the button to lower the leveler onto the truck or trailer. Pressing the button 73 allows faster operation by causing the lip assembly 15 to extend before the deck assembly 11 is fully raised.

When the loading operation is finished, the operating sequence is reversed.

The operator presses the button 72 to raise the deck assembly 11 and retract the lip assembly 15 and then releases the button to lower the leveler 10 to the stored position with the lip assembly 15 resting on the lip keepers 14.

The operator turns the selector switch 71 to Door. The indicator light 76 is illuminated to indicate that the symbols for the door are in effect.

The operator presses the button 73 to close the door 18.

The operator turns the selector switch 71 to Restraint. The indicator light 75 is illuminated to indicate that the symbols for the vehicle restraint are in effect.

The operator presses the button 73 to cause the vehicle restraint hook 21 to lower to release the truck or trailer.

The three positions of the selector switch 71 and illumination of the lights 75, 76 and 77 clearly separate the functions of the various devices and illustrate the proper operational sequence.

Description of a Second Optional Embodiment.

Figure 5:
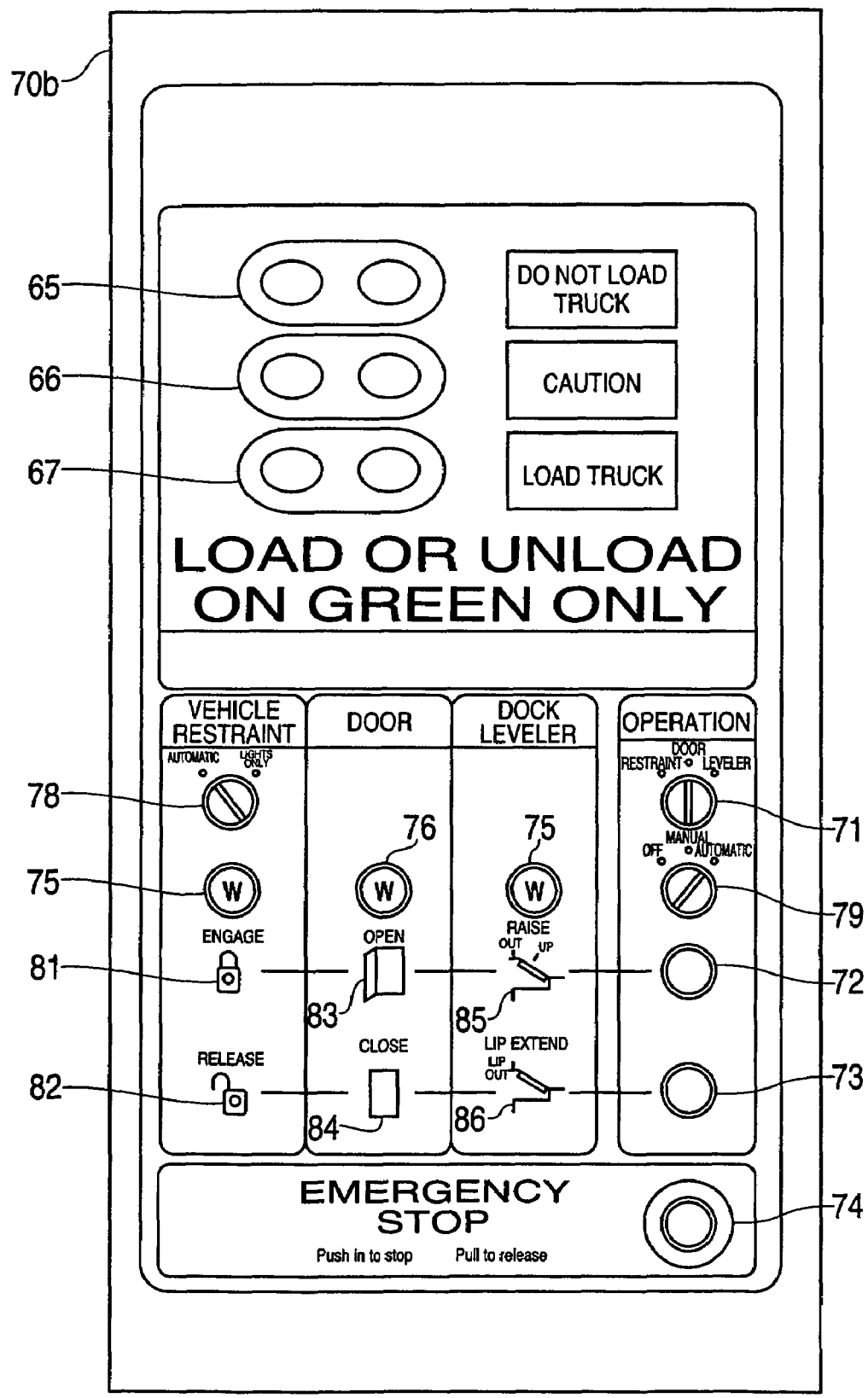
FIG. 5 is a front view a second optional embodiment of combination control panel in accordance with the invention with a simplified operating sequence.

FIG. 5 shows a control panel 70b which is similar to the panel 70a in FIG. 4 but has additional functions. The panel has selector switches 71 and 78, push buttons 72, 73 and 74, and three indicator lights 75, 76, 77. An array of 6 operating symbols 81 through 86 indicate the operational functions of each button. In addition there is a selector switch 79 which has 3 positions Off, Automatic and Manual. Turning the selector switch 79 to the Off position shuts off electrical power to the entire control panel 70b. When the selector switch 79 is turned to Manual, the three positions of selector switch 71 (Restraint, Door, Leveler) have the same functions as previously described for panel 70a. Turning the selector switch 79 to the Automatic position provides a simplified, more automated sequence of operations. When the vehicle restraint 20 is stored, the indicator light 75 is illuminated to indicate that the symbols for the vehicle restraint, 81 and 82 in the first column, are in effect.

The operator presses the button 72 to cause the vehicle restraint to engage the truck or trailer.

When the vehicle restraint 20 has engaged the truck or trailer, the indicator light 76 is automatically illuminated to indicate that the symbols for the door, 83 and 84 in the second column, are in effect.

The operator presses the button 72 to open the door 18.

When the door 18 has opened or begins to open, the indicator light 77 is automatically illuminated to indicate that the symbols for the dock leveler, 85 and 86 in the third column, are in effect.

The operator presses the button 72 to place the leveler on the truck or trailer. Pressing the button 73 allows faster operation by causing the lip 15 to extend before the leveler 10 is fully raised.

When the loading operation is finished, the operating sequence is reversed.

The operator presses the button 72 to raise the leveler, fold the lip 15 and then releases the button to lower the leveler 10 to the stored position.

When the leveler 10 is properly stored, the indicator light 76 is automatically illuminated to indicate that the symbols for the door are in effect.

The operator presses the button 72 to close the door 18.

When the door 18 is fully closed, the indicator light 75 is illuminated to indicate that the symbols for the vehicle restraint 20 are in effect.

The operator presses the button 73 to cause the vehicle restraint 20 to release the truck or trailer.

Thus the entire operational sequence can be performed by simply pressing buttons 72 and 73 in the proper sequence as indicated by the lights 75, 76 and 77 and the graphical symbols 81 through 86 associated with each button.

Description of a Third Optional Embodiment.

Figure 6:
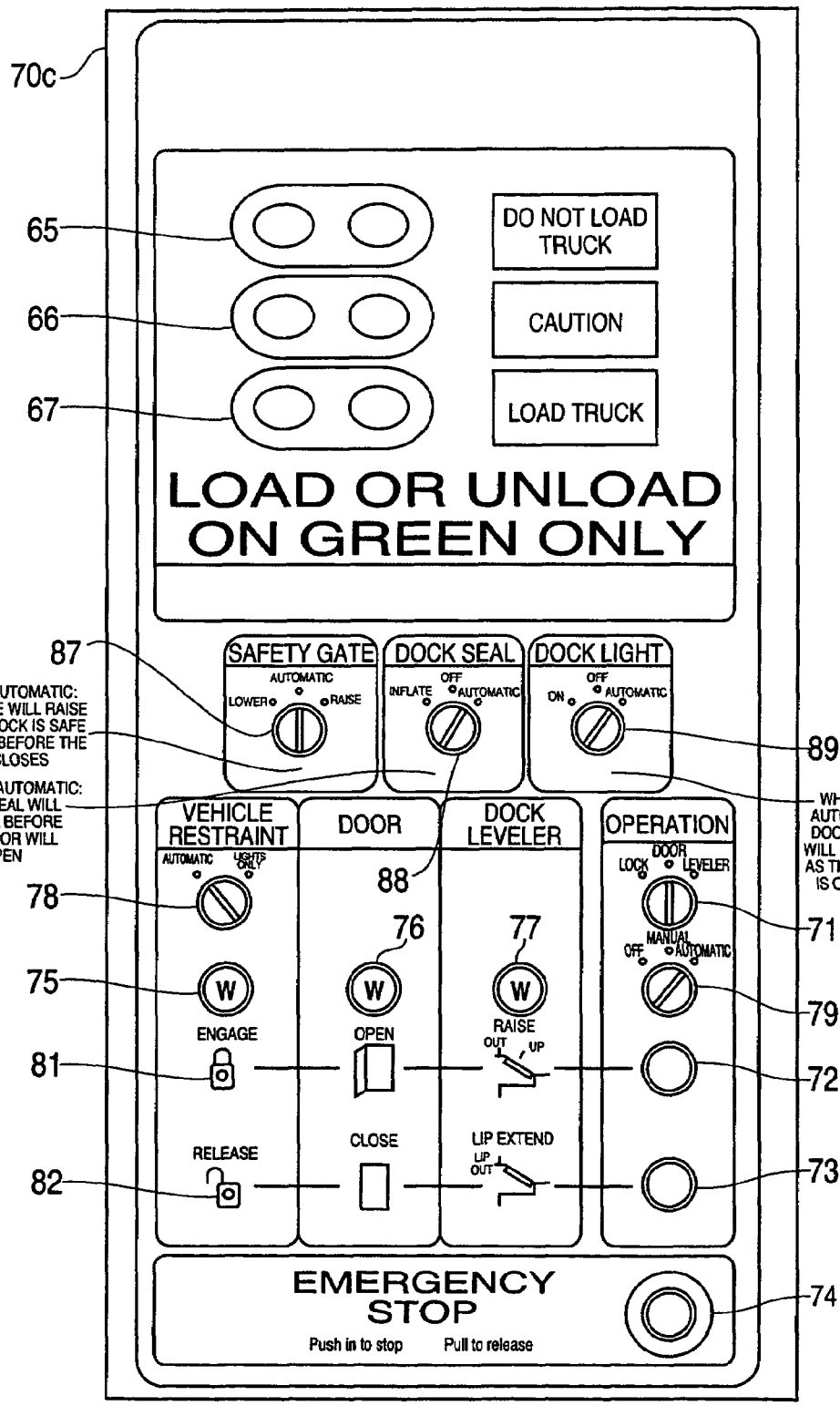
FIG. 6 is a front view of a third optional embodiment of a combination control panel in accordance with the invention with a simplified operating sequence.

FIG. 6 shows a control panel 70c which is similar to the panel 70b in FIG. 4 but has additional functions. The panel has selector switches 71 and 78, push buttons 72, 73 and 74, and three indicator lights 75, 76, 77. The selector switches 71 and 78 have the same positions and functions as previously described. This control panel also controls additional equipment including a barrier gate 31, an inflatable shelter 35 and a loading light 28. Selector switch 87 has three positions Raise, Automatic and Lower. When the Automatic position is selected, the barrier gate 31 is automatically raised (also referred to as disengaged) when vehicle restraint 20 has secured the truck or trailer and automatically lowers (also referred to as engaged) before the vehicle restraint 20 releases the truck or trailer. It is to be understood that while the barrier is shown in FIG. 1 as a gate, in other embodiments of the invention the barrier could be in forms other than a gate. In embodiments with other types of barriers the controller will engage and disengage the barrier. Similarly, selector switch 88 has three positions Off, Automatic and On to control the inflatable shelter 35. When the Automatic position is selected, the shelter 35 is automatically inflated when the door 18 is opened and is allowed to deflate when the door 18 is closed. When the Off position is selected, the shelter 35 is disabled, and remains off when the remaining dock loading apparatus is operating.

Selector switch 89 has three positions Off, Automatic and On to control the loading light 28. When the Automatic position is selected, the loading light 28 is automatically turned on when the door 18 is opened and is turned off when the door 18 is closed. When the Off position is selected the loading light 28 is disabled and remains off when the remaining dock loading apparatus is operating.

Figure 10:
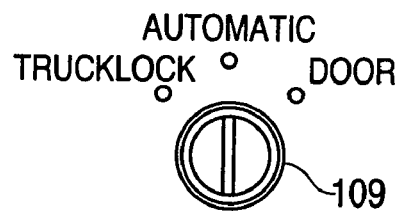
FIG. 10 is a front view of an optional selector switch for selecting different operating modes.

The Raise and Lower positions of selector switch 87, and the Off and On positions of selector switches 88 and 89 allow manual control of the barrier gate 30, the inflatable shelter 35 and the loading light 28. For example, the operator may wish to leave the door 18 open and the shelter 35 to remain deflated for ventilation in hot weather, or the selector switches may be used to manually operate each device independently for inspection or maintenance. The selector switch 79 may have positions Manual and Automatic. When the Manual position is selected, the door 18 can be left open for ventilation in hot weather. Also, a selector switch 109 as shown in FIG. 10 may be included on the control panel 70c to operate individual pieces of equipment. When the selector switches are all set to Automatic, the operation is now:

When the vehicle restraint is stored, the indicator light 75 is illuminated to indicate that the symbols for the vehicle restraint, 81 and 82 in the first column, are in effect.

The operator presses button 72 to cause the vehicle restraint 20 to engage the truck or trailer.

When the vehicle restraint 20 has engaged the truck or trailer, the barrier gate 30 automatically raises and the indicator light 76 is automatically illuminated to indicate that the symbols for the door, 83 and 84 in the second column, are in effect.

The operator presses the button 72 to open the door 18.

When the door 18 starts to open, the inflatable shelter 35 automatically starts to inflate. When the door 18 has fully opened, the loading light 28 is automatically turned on and the indicator light 77 is automatically illuminated to indicate that the symbols for the dock leveler, 85 and 86 in the third column, are in effect.

The operator presses the button 72 to raise the leveler 10 and releases the button 72 to lower the leveler on to the truck or trailer. Pressing the button 73 allows faster operation by causing the lip 15 to extend before the leveler 10 is fully raised.

When the loading operation is finished, the operating sequence is reversed.

The operator presses button the 72 to raise the leveler 10, fold the lip 15 and then releases the button to lower the leveler 10 to the stored position.

When the leveler 10 is properly stored, the indicator light 76 is automatically illuminated to indicate that the symbols for the door are in effect.

The operator presses the lower button 73 to close the door 18. As the door 18 starts to close, the loading light 28 is automatically turned off.

When the door 18 is fully closed, the inflatable shelter motor stops and the shelter 35 starts to deflate, and the indicator light 75 is illuminated to indicate that the symbols for the vehicle restraint are in effect.

The operator presses button 73 to cause the vehicle restraint 20 to release the truck or trailer. The barrier gate 30 automatically lowers and then the vehicle restraint 20 releases the truck or trailer.

Thus the entire operational sequence can be performed by simply pressing buttons 72 and 73 in the proper sequence as indicated by the lights 75, 76 and 77 and the graphical symbols associated with each button.

Although the door 18 and inflatable shelter 35 operation can be controlled automatically, additional selector switches 106 and 88 can provide over-ride or by-pass functions to allow the door 18 to remain open or the inflatable seal 35 to remain deflated for ventilation in hot weather.

It is evident from the previous descriptions that there can be many variations in the dock equipment and sequence of operations. However, having multiple functions provided by the repeated presses of a single button provides control of the sequences and simplifies the operation.

Automatic Control for Loading Dock Equipment.

Description of a Fourth Optional Embodiment.

Figure 7:
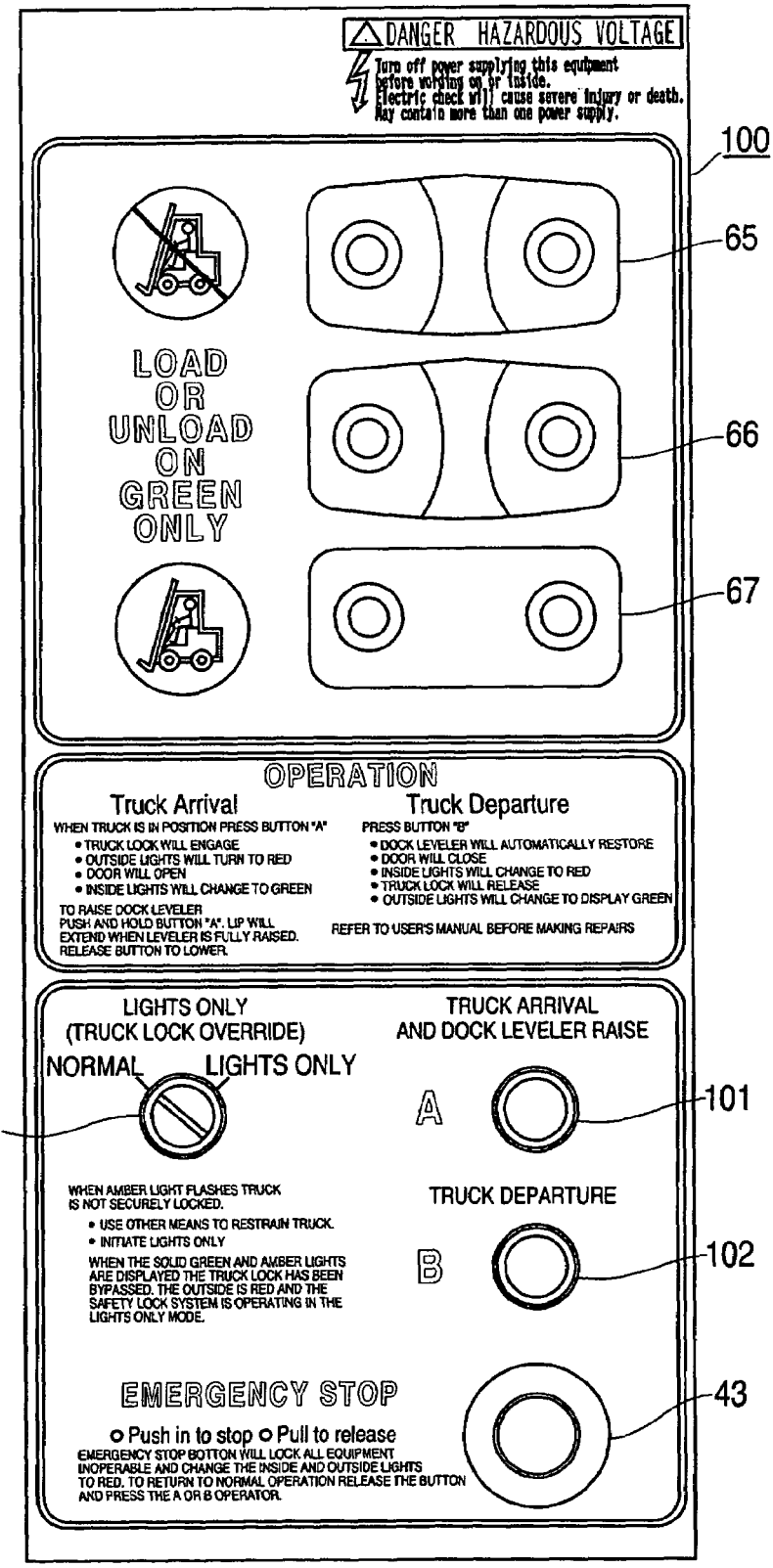
FIG. 7 is a front view of a fourth optional embodiment of a combination control panel in accordance with the invention with automatic features.

FIG. 7 shows a control panel 100 which has an even more simplified operation sequence. Three lights 65, 66 and 67 which are red, amber and green respectively, indicate to the dock operator the status of the dock equipment. The inside red light 65 indicates that the truck or trailer is not ready to load, and the inside green light 67 indicates that the truck or trailer is ready to load. The inside amber light 66, either steady or flashing, may be used to indicate a truck present, operator be cautioned, or error conditions. The selector switch 51 has two positions, Normal and Lights Only which bypasses the vehicle restraint 20 if the truck or trailer cannot be secured by the vehicle restraint 20. The selector switch 51 may be momentarily in the Lights Only position, then return by spring or other means to the Normal position. A push button could be used in place of the selector switch.

This control panel 100 may control many loading dock devices which could include a vehicle restraint 30, door 18, barrier gate 30, inflatable shelter 35 and a loading light 28. The control panel 100 also has two push buttons, 101 labeled "A" and 102 labeled "B". The push button 43 operates a maintained contact Emergency Stop switch.

Operation of the equipment is controlled by a programmable controller. Such devices are well known in the industry and will not be described in detail. The basic requirement is that each piece of dock equipment has sufficient limit switches or sensors which send signals to the controller to indicate the state of equipment. The controller then sends signals to enable the motors or actuators for the various devices. For example, a vehicle restraint 20 usually requires 3 sensors, one each to indicate that the vehicle restraint 20 is stored, fully raised, and whether the rear impact guard (RIG) of the truck or trailer has been engaged. Similarly a door 18 usually requires at least 2 sensors, one to indicate that the door 18 is closed, and another to indicate that it is fully opened. However a manually operated door 18 may require only one sensor to indicate whether it is fully opened, or raised high enough to clear the operating range of the dock leveler 10. When the proper conditions have been achieved, the controller will then enable the motors or actuators which operate the next device. Such a control system is very flexible and is not limited to specific devices or specific operational sequences.

The sequence of operations will be described for a dock which has a vehicle restraint 20, power operated door 18, barrier gate 30, inflatable shelter 35, loading light 28. Note that this document merely describes envisioned typical sequences of operations. In practice, sequences may be modified in accordance with the invention to suit a specific customer requirement.

After a truck or trailer has been positioned at the dock door 18, the operator presses the Arrival button 101 marked "A". The vehicle restraint 20 then starts to raise the restraining hook 21, and the outside lights 23 change from green to red to indicate that the driver should not move the vehicle. If the hook 21 cannot engage the RIG, the inside red and amber lights 55 and 56 will alert the operator. The operator should then secure the truck with manual wheel chocks or other means, and then turn the selector switch 51 to the Lights Only position (also referred to as a bypass position) to continue the operation. If the RIG is secured, the operation will continue automatically. When the vehicle restraint 20 has engaged the trailer, the controller will then send a signal to raise the door 18. As the door 18 starts to open, the controller will start the blower motor for the inflatable shelter 35. When the door 18 is fully opened, the controller will raise the barrier arm 31 to allow access to the truck or trailer, and turn on the loading light 28. When the barrier 31 is fully raised, the inside green light 67 will indicate that the dock is ready to use. The operator may now use the button 101 marked "A" to raise the dock leveler.

When the loading operation is finished, the operating sequence is reversed. The operator presses the "Truck Departure" button 102 marked "B" to initiate the sequence. The dock leveler 10 automatically raises to fold the lip 15 and lowers to the stored position. When the leveler 10 is properly stored, the operator again presses the button 102 marked "B" and the entire sequence will be reversed to lower the barrier, close the door 18 and release the vehicle restraint 20. Additional operating enhancements may be included in the control program. For example, the controller may require that the "Truck Departure" button be held for several seconds before the restoring sequence begins. This would prevent operation by someone inadvertently pressing the button. Also, an audible alarm may be energized when the "Truck Departure" button is pressed to warn dock workers that the door is about to close and the truck will be released. Other enhanced features may include a time delay before releasing the vehicle restraint to ensure that the inflatable shelter has had time to deflate.

Also, at any time the operator may push the Emergency Stop button 43. This will stop all operation of the equipment. When the problem has been resolved, the operator will pull out Emergency Stop button 43 and then may press the "A" button to continue the operation or press the "B" button to restore the equipment to the initial state. Thus the entire operational sequence can be performed by simply pressing the buttons 101 and 102 without requiring the operator to make decisions about the sequence of operations.

Although this control system makes the operation very simple, it does not prevent the flexibility required for maintenance or special operating needs. This control system has the ability to provide special operating sequences.

Figure 8:
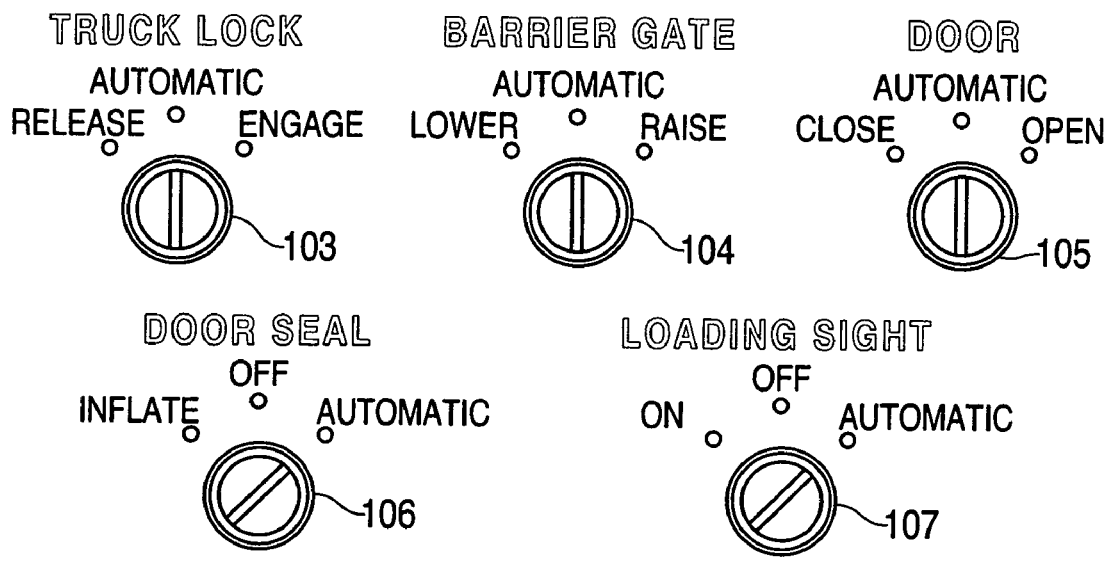
FIG. 8 is a front view of several optional manual select switches.
Figure 9:
FIG. 9 is a front view of an optional configuration of manual select switches.

For maintenance, there is often a requirement for independent operation of a specific device. For example, if the vehicle restraint 20 malfunctions, there is a requirement to operate the vehicle restraint 20 independently without initiating the door open sequence. FIG. 8 shows several selector switches which allow independent operation of the equipment used in the sequence described previously. Because maintenance or selection of special operating features is usually restricted to more skilled or supervisory personnel, these switches may be mounted on the exterior of the control panel 70*a*, 70*b*, 70*c*, 100 and may be controlled by keyed switches or they may be mounted inside the control panel 70*a*, 70*b*, 70*c*, 100 for use only by maintenance personnel. Also, instead of a rotary style selector switch, other configurations, such as a slide switch 108 shown in FIG. 9, may be used for many of the switches described herein.

Operation of the maintenance switches will be described. Selector switch 103 controls the operation the vehicle restraint 20. With the selector switch 103 in the Automatic position, operation is controlled by the programmable controller. Turning the selector switch 103 to the right or left causes the vehicle restraint 20 to be raised or lowered by the maintenance technician. Similarly the selector switches 104, 105, 106, and 107 provide manual control of the barrier gate 30, door 18, door seal 35 and loading light 28.

In the case of the dock light 28 and inflatable door seal 35, turning the manual control to the off position for those features will cause the dock light 28 and door seal 35 to be disabled, and the controller will ignore the dock light 28 and door seal 35 while automatically controlling the other devices through their normal sequences.

FIG. 10 shows a simplified configuration with only a vehicle restraint 20, door 18 and dock leveler 30. Instead of a separate selector switch for each device, a single selector switch 109 allows use of the "A" and "B" buttons, 101 and 102, to raise or lower the device. Note that no selector switch position is required for the dock leveler because the door must be open before the dock leveler is used and turning the selector switch 51 to the lights only position allows the vehicle restraint to be bypassed.

In addition to operation for maintenance, the selector switches may also be used to bypass or override any device (with the exception of the vehicle restraint were a lights only mode may be selected rather than normal use of the restraint). For example, the selector switch 105 may be used to manually control opening and closing of the door 18 for maintenance purposes. However, in some climates there may be a desire to leave the door 18 open on hot days. By turning the selector switch 105 to the "Open" position, the door 18 will remain open and the controller will ignore the door 18 while automatically controlling the other devices through their normal sequences. Similarly the other devices such as the barrier gate 30, door seal 35 and loading light 28 may be manually controlled.

An optional feature of any of the embodiments may include a selector switch (not shown) which permits an operator to operate different dock bays with the same control panel. For example the selector switch may permit an operator to select bay A, B, C, or the like.

While specific labels have been applied to positions of the various selector switches and controls, those labels are meant to generally characterize the functions that will occur when various positions are selected. The specific labels themselves are not meant to be limiting the invention to switches with those specific labels.

It is evident from the previous descriptions that there can be many variations in the dock equipment and sequence of operations. The number of devices and operations is limited only by the number of input and output terminals on the controller. Having the functions operate automatically in the correct sequence simplifies the operation of dock equipment for unskilled operators. The specific embodiments described herein are exemplary. Features described herein may be added or deleted according to customer requirements and remain within the scope of the invention.

According to another embodiment of the present invention a remote control system 201 is provided. FIGS. 11–15 illustrate a loading dock 200 in accordance with the present invention that includes a remote control system 201 for remotely operating loading dock equipment. The remote control system 201 allows dock workers such as fork truck operators to activate the loading dock apparatus such as the vehicle restraint, the dock leveler, the dock door, a barrier gate, lights and other loading dock equipment to be operated while seated on the fork truck. One important consideration in using remote control panels for dock equipment is to ensure that the remote control operates only equipment associated with the specific bay or portion of the loading dock that is intended to be operated. For example, it may be undesirable for dock worker working at a particular dock bay were to operate equipment located at bay several feet away where other operations were occurring. Therefore, in accordance with the invention, remote control for dock loading equipment operates only equipment associated with a particular loading dock bay.

Figure 11:
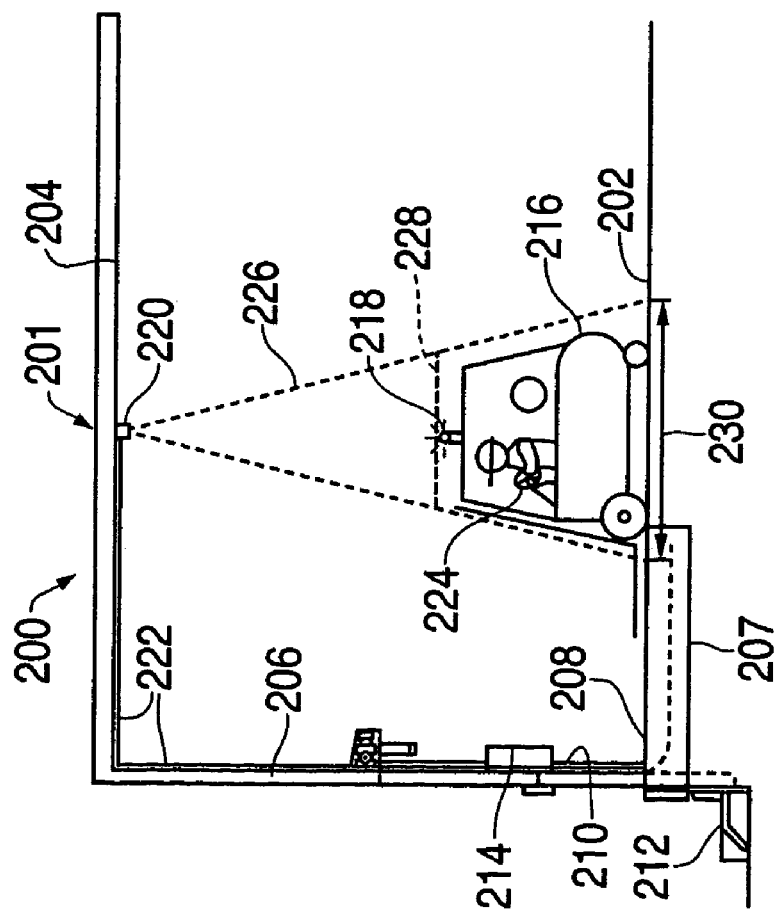
FIG. 11 is a side view of a loading dock with the loading dock equipment control system installed in accordance with the invention.

FIG. 11 shows a loading dock 200 equipped with a remote control system 201. The loading dock 200 includes a dock floor 202, a dock ceiling 204 and a dock wall 206. Within the dock floor 202 is a pit 207 in which a dock leveler 208 is mounted. Attached to the dock wall 206, a dock door 210 is provided. The dock door 210 opens in a similar way as a standard garage door. In other words, it is mounted to rollers that ride up a track allowing the dock door 210 to rise up to an overhead position.

Outside of the loading dock 200 is a vehicle restraint 212 configured to attach to vehicles parked at the loading dock 200. The vehicle restraint 212 prevents vehicles from moving away from the loading dock 200 as cargo and equipment and moved in and out of the vehicle. While a hook type vehicle restraint is shown, other vehicle restraints 212 such as wheel chocks and the like may also be used in accordance with the present invention.

The loading dock equipment (for example, a dock leveler 208, a dock door 210 and a vehicle restraint 212) and other equipment are controlled by a control panel 214 mounted to the dock wall 206. In accordance with some embodiments of the present invention, the control panel 214 may be a standard control panel type of control panel as described previously herein, or any other suitable control panel. A remote control signal receiver 220 is mounted to the loading dock ceiling 204.

As previously mentioned, a feature of some embodiments of the present invention is to permit remote control of dock equipment related to a specific bay within a loading dock and to not inadvertently operate dock equipment associated with other bays within the loading dock 200. For the purposes of this description, the term "bay" refers to a portion of a loading dock and associated equipment that is dedicated to the loading and unloading of one vehicle parked at the dock. Optionally, a remote control may operate equipment associated with several bays of a loading dock but which bays are controlled and at which time the bays are controlled by a remote controller is pre-selected. For example, at a facility having 8 bays, an operator can select to operate only equipment at bays 1, 2, 4 and 7. This feature may be useful in security application such as a situation where an operator wants to shut and lock all of the dock doors at once.

Preferably, the remote control will operate equipment at only one bay at a time. To achieve this objective, the remote control system 201 provides a zone 226 in which signals between a transmitter 218 and a receiver 220 can be received. If the transmitter 218 is located outside of the zone 226 then any signals transmitted by the transmitter 218 will not be received by the receiver 220 or in some embodiments of the invention, the signal will be ignored.

In accordance with an embodiment of the present invention, the zone 226 is conical in shape. The zone 226 has a narrow end near the receiver 220 and the broad end located near the transmitter 218 as shown in broken lines in FIGS. 11, 13, and 14.

According to some embodiments of the present invention, the transmitter 218 is mounted on a fork truck 216. When the fork truck 216 is located within the zone 226, the transmitter 218 can communicate with the receiver 220. Mounted on the fork truck 216 is a controller 224 operatively connected to the transmitter 218. The controller 224 can be operatively connected to the transmitter 218 by a wire system or some suitable wireless configuration. Preferably, the connection between the controller 224 and the transmitter 218 is a wired connection. In some embodiments of the invention, the controller 224 is a compact controller with the controls and actuators similar to those found on the control panel 214.

The controller 224 has actuators and selector switches that will permit the operator of the fork truck 216 to operate the dock leveler 208, the vehicle restraint, 212, the dock door 214 and any other pieces of loading dock equipment that may be desired to be operated such as lights, fans, a barrier or the like. Alternative embodiments of the present invention will include a controller 224 similar to the control panels already described herein having an automatic mode or being configured to automatically control loading dock equipment.

According to one embodiment of the present invention, controller 224 will include a single actuating button with a selector switch for selecting which piece of loading dock equipment to operate such as a dock leveler 208, the dock door 210 or vehicle restraint 212.

According to one embodiment of the present invention, the operation of the system 201 is as follows. A transport vehicle will back up to the loading dock 200. Initially, the dock leveler 208 is in stored position, the restraint 212 is in the stored position, and the door 210 is closed. Assuming the cargo doors of the vehicle are open, the first operation will be to restrain the vehicle. An operator of the fork truck 216 can actuate an actuator on the controller 224 which will cause the restraint 212 to engage the trailer. Whether the restraint 212 is a hook type restraint as shown in FIG. 11 which will engage the RIG on the trailer or another restraint 212 such as a wheel chock type restraint which will cause a chock to block a wheel of the trailer, it does not matter, as any suitable restraint 212 may be used in accordance with the invention. Once the restraint 212 has engaged the trailer, interior lights will display green to let dock workers know the trailer is restrained. Exterior lights will display red to let the vehicle operator know that the vehicle is restrained and that the vehicle and should not be driven away. The dock door 210 is opened by the operator by actuating an actuator on the remote control panel 224. The door control relay may cause a transmit a signal and cause the door 210 to fully open. Once the door 210 is opened, the dock leveler 208 is actuated to create a bridge between the dock floor 202 and the vehicle bed.

According to some embodiments the present invention, operation of the dock leveler occurs as follows. The operator will press and hold a button on the remote controller 224. A signal will be transmitted from the transmitter 218 and may be maintained as long as the operator holds the button down. Continuing to hold the button on the remote controller 224 will cause the dock leveler 208 to raise up from the stored position and when the dock leveler arrives at a certain point the lip will extend from its pendent position. Optionally, the dock leveler 208 is raised to a satisfactory position by the operator pressing a button on the remote controller 224. The operator will release the button on the remote control 224 and the dock leveler 208 will descend with the lip extended causing the lip to rest on the bed of the vehicle. In some embodiments the invention, it may not be desired to rest the lip on the bed of the vehicle. For example, if an end load condition occurs, the lip can be retracted or brought back to its pendent position by actuating an actuator on the remote control 224.

Once the vehicle is ready to leave the dock 200, the operator will press a button on the remote controller 224. A signal will be maintained and transmitted by the transmitter 218 as long as the operator continues to press the button. The signal will cause the motor on the dock leveler 208 to start to raise the dock leveler 208. The dock leveler 208 will raise and the lip will drop to its pendent position. At this point, the operator can release the button on the remote controller 224 and the dock leveler 208 will lower into its stored position. Sensors associated with the dock leveler 208 will then cause the dock leveler to send a signal to the control panel 214 that the dock leveler 208 is again in the stored position.

The operator will then actuate the remote control panel 224 and this will cause the door relay to transmit a signal and the door 210 will then close. Once the door 210 has started to close the operator can again actuate a control on the remote controller 224 which will cause the vehicle restraint 212 to release the vehicle. Once the vehicle restraint 212 has released the vehicle, interior lights will change to red indicating to dock workers that the vehicle is no longer secured to the loading dock 200 and the exterior lights will change to green indicating to a vehicle operator that the vehicle is no longer restrained and can be pulled away from the loading dock 200.

According to one embodiment of the present invention, the remote control 224 will be laid out similar to, and have all the actuators of, the master control panel 214. Preferably, the remote control 224 will have push buttons and/or selector switches as actuators. Preferably, the remote controller 224 will have a restraint "engage" and "release" actuators a "lights only" actuator, a "door open" actuator, and a dock leveler "raise" and "lip extend" actuators, and a "stop" actuator for stopping the dock leveler 208.

Some embodiments of the present invention will include remote controllers 224 that will be small portable versions of master control panels described above and shown in FIGS. 2–7 in more detail.

According to some embodiments of the present invention, the receiver 220 is an infrared type receiver. However, the receiver 220, while referred to as a receiver, it is not limited to receiving functions only, but in some embodiments may also transmit messages to the controller 224. Preferably, the receiver 220 is an infra red type receiver that has a zone in which it is able to receive a transmitted infra red signal.

The zone 226 is preferably conical with the small portion of the cone starting at the receiver 220 and become progressively broader as it extends away from the receiver 220. Optionally the zone 226 may be any suitable shape and is not limited to a conical shape. In an exemplary embodiment of the invention, the receiving zone 226 has a diameter of about 10 feet at the floor 202. This diameter is illustrated by reference numeral 230 in FIG. 11. Because the transmitter 218 is located on top of a fork truck 216, the diameter of the zone 226 is smaller at the location of the transmitter 218 than it is at the floor 202. According to one exemplary embodiment of the present invention, the diameter of the zone 226 at the height of the transmitter 218 is about 6 feet. The height of the transmitter 218 is about 8 feet or so above the floor 202 and noted by reference numeral 228. In an exemplary embodiment of the present invention, the height between the ceiling 204 and the floor 202 of the loading dock 200 is about 20 feet.

Figure 12:
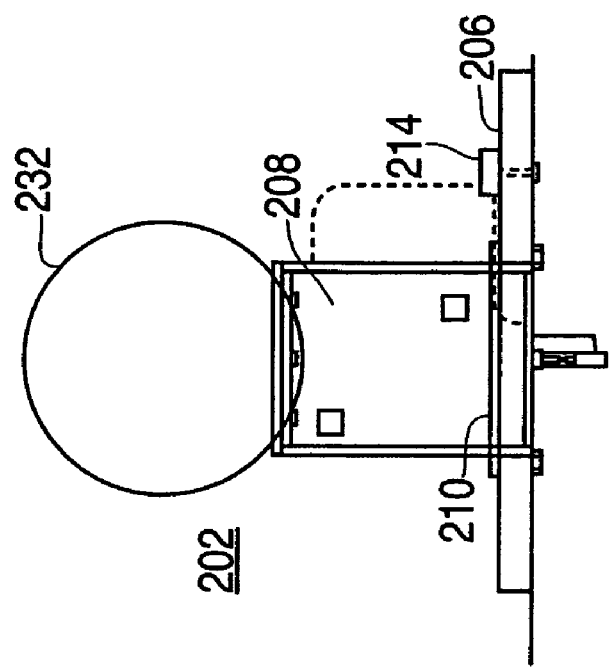
FIG. 12 is a top view of a loading dock with the loading dock equipment control system installed in accordance with the invention illustrating the remote control zone.

In some embodiments of the present invention, the location of the zone 226 is indicated by indicia 232 illustrating the outline of the boundaries of the zone 226 as it intersects with floor 202. FIG. 12 illustrates where the zone 226 is indicated on the floor 202 by indicia 232. The indicia 232 is located just in front of the dock leveler 208. The indicia 232 can be paint, chalk, tape, etching in the floor, or any other suitable way of marking the boundaries of the zone 226. The entire zone 226 may be filled in by the indicia 232 or just the boundaries may be illustrated according to the individual desires or requirements of a particular installation. Because the preferred zone 226 is in a conical shape, the zone 226 when put on a flat surface such as a dock floor 202 is in the shape of a conic section such as a circle or other conic section. If the receiver 220 is configured to receive signals broadcast straight up from it, then the zone 232 is likely to be in the shape of a circle. If the receiver 220 is canted at an angle then the zone 226 is likely to intersect with the floor 202 as an ellipse rather than a circle.

Figure 13:
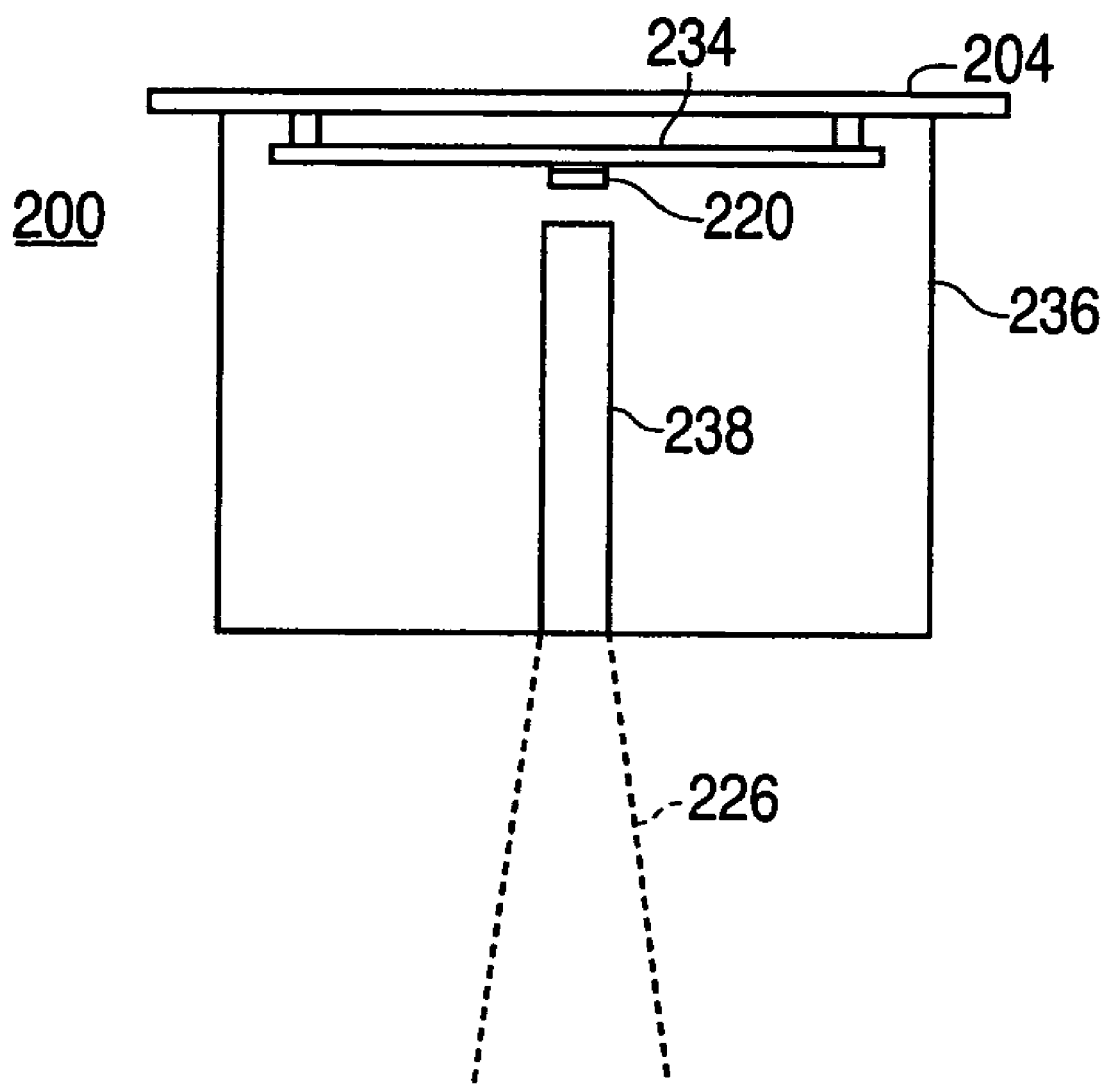
FIG. 13 is a side view of a signal receiver/transmitter in accordance with one embodiment of the invention illustrating the conical transmitting and receiving zone.

FIG. 13 illustrates one way for controlling the size and shape of the zone 226. A transmitter 220 is mounted via a bracket 234 to a ceiling 204 of a dock 200. The receiver 220 receives its signal through a hollow tube 238. The hollow tube 238 may be attached to a housing 236 which can be directly attached to the ceiling 204 and may also be attached to the bracket 234 upon which the receiver 220 is also attached. Changing the length shape, and angle of the tube 238 will effect the size and shape of the zone 226. One skilled in the art will make appropriate design choices with respect to the tube 238 (including whether to use one at all) in order to fit the requirements of an individual installation.

According to some embodiments of the invention, the range or distance by which the transmitter can transmit a signal is not used when defining the zone 226.

Figure 14:
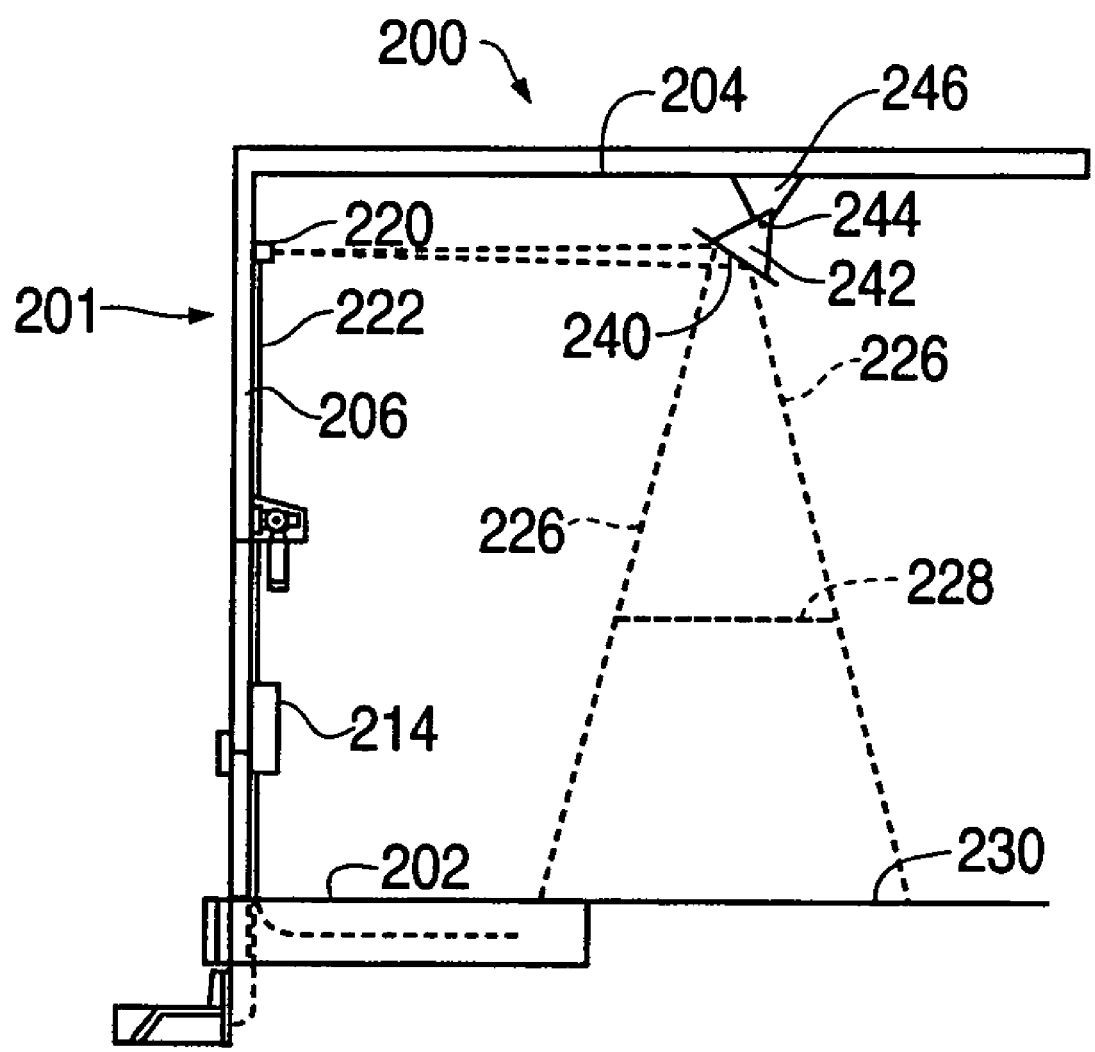
FIG. 14 is a side view of a loading dock with a loading dock equipment control system installed in accordance with another embodiment of the present invention.

FIG. 14 shows one optional embodiment of the present invention. In FIG. 14 a loading dock 200 is shown with a control system 201. Control system 201 includes a infra red receiver 220 attached to a wall 206 of the loading dock 200. The infrared receiver 220 is connected to the master control panel 214 via a phone line 222.

In some embodiments of the present invention, the receiver 220 and the master control panel 214 may be in communication through other means suitable to accomplish the invention. Other communication means may be wireless or otherwise. As shown in FIG. 14, the infrared receiver 220 is mounted to the wall 206 and configured to receive a signal from a reflector 240. In some embodiments the invention, the reflector 240 may be a mirror. The reflector 240 is attached to the ceiling 204 by a reflector bracket 246. The reflector 240 is connected to a reflector housing 242. The reflector housing 242 is pivotally connected to the reflector bracket 246 by a pivot 244.

In some embodiments the invention, the reflector 240 may be fixed or connected in a manner that is not pivoting but permits movement of reflector 240 to adjust how a signal is reflected by the reflector 240. Dashed lines illustrate boundaries of zone 226 where transmitter 218 (the transmitter 218 not shown in FIG. 14, but shown in FIG. 1 1) must be located in order for a signal to be read by the infrared receiver 220. If an infrared signal is sent outside the zone 226, the signal will not be reflected by the reflector 240 back to the infrared receiver 220. However, if the infrared transmitter 218 does transmit a signal within the zone 226 then infrared signal will be reflected by the reflector 240 back to the infrared receiver 220.

Line 228 illustrates the size of the zone 226 at the height an infrared transmitter 218 is located in accordance with one embodiment of the invention where the infrared transmitter 218 is located on the top of a fork truck 216. Dimension 230 illustrates the magnitude of the zone 226 at the level of the floor 202 of the loading dock 200.

To aid a fork truck driver in ensuring that the infrared transmitter 218 located on the top of the fork truck 216 is within the zone 226, indicia 232, as shown in FIG. 12, may be marked on the floor 202 indicating the location of the zone 226. The indicia 232 may be marked lines along the outer boundaries of the zone 226, marking of a solid shape indicating the location of the zone 226, or any other suitable indicia of the location of the zone 226. The indicia 232 allow the fork truck driver to know where to drive the fork truck 216 to have the transmitter 218 within the zone 226.

Other than the use of a reflector 240 rather than a direct signal from the transmitter 218 to the receiver 220, the embodiment shown in FIG. 14 operates substantially similar to that as shown and described in FIG. 11.

According to another embodiment of the present invention, radio signals may be used instead of infrared signals. The embodiment shown in FIG. 15 uses radio signals transmitted by a transmitter. Three receivers 248, 249 and 250 are placed at different parts of the loading dock 200 where they both receive the radio signal transmitted by the transmitter. When a signal is transmitted by a transmitter, it is sent out in all directions. Signal receiving stations 248, 249, and 250 receive the signal. The location from which the signal is sent is determined by use of triangulation techniques. Lines 252, 253, and 254 are representative of the distance from which the signal was sent to receivers 248 and 250 when the transmitter is located in the center of the zone illustrated by the indicia 232. Arrowheads on lines 252, 253, and 254 indicate the direction of travel of the signal. By calculating the point of intersection between the three signals (the ones received by receiver 248, 249, and 250) a processor can be programmed to determine where the signal was transmitted from. A processor can further be programmed to determine whether the signal was transmitted from a predefined equipment operation zone illustrated by indicia 232. If the signal was transmitted from within the predetermined zone 232, the system 201 will be responsive to the signal. If, however, the signal was transmitted from an area other than the predetermined zone then the system 201 will ignore the transmitted signal. Size and location of the zone can be programmed into the processor controller and modified according to the individual needs of particular installation. Other configurations of receivers and transmitters may be used by one skilled in the art after reviewing this disclosure to achieve a configuration in accordance with the invention.

In some embodiments of the invention, multiple bays at a single loading dock 200 can be controlled by the same remote controller. Each bay will have a corresponding zone. When a signal is sent by a transmitter, the receiving stations 248, 249, and 250 will determine if the signal was received within a particular zone and if so, the equipment associated with that zone to be responsive to the signal.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A remote control system comprising:
a receiver operatively connected to equipment to be controlled by the system;
a remote control configured to communicate with the receiver to control the equipment;
a transmitter operatively connected to the remote control; and
a zone located proximate to the equipment to be controlled by the system defined by at least one receiver and remote control wherein the remote control and the receiver communicate with each other when the transmitter is located in the zone and can not communicate with each other when the transmitter is not in the zone and the zone is not defined by a range associated with the transmitter.

2. The system of claim 1, further comprising indicia marked on a surface indicating at least one boundary of the zone.

3. The system of claim 2, wherein the indicia are located on a floor and is shaped as a conic section.

4. The system of claim 3, wherein the indicia is shaped into a circle.

5. The system of claim 2, wherein the indicia have a radius of about 5 feet.

6. The system of claim 5, wherein the receiver is operatively connected to the control panel via a telephone wire.

7. The system of claim 1, wherein the system operates loading dock equipment.

8. The system of claim 7, wherein the remote control is located on a fork truck.

9. The system of claim 8, wherein the transmitter is located on the fork truck and transmits the signal substantially straight up.

10. The system of claim 7, wherein the receiver is configured to communicate with a control panel associated with loading dock equipment.

11. The system of claim 10, wherein the receiver communicates with the control panel via a phone cord.

12. The system of claim 1, wherein the receiver comprises at least three radio receivers that triangulate a radio signal sent by the remote control.

13. The system of claim 1, wherein the receiver and the remote control communicate via an infrared signal.

14. The system of claim 13, wherein the infrared signal is transmitted through a tube and an inner diameter of the tube limits a diameter associated with the signal and thereby limits a size of the zone.

15. The system of claim 13, further comprising a reflector configured to reflect the signal between the receiver and the remote control.

16. The system of claim 1, further comprising a plurality of receivers and zones wherein each zone corresponds with one and only one receiver and the remote control is configured to operate equipment associated with each receiver when the transmitter is the zone associated with a particular receiver.

17. The system of claim 1, wherein the receiver is operatively connected to a control panel configured to control the equipment.

18. The system of claim 1, wherein said remote control system operates loading dock equipment with a controller located on a fork truck.

19. The system of claim 18, wherein said remote control system moves the fork truck to a pre-determined zone before operating the loading dock equipment.

20. The system of claim 19, further including markings on the loading dock floor indicating at least one boundary of the zone that the controller will work to operate the loading dock equipment.

21. A loading dock control system comprising:
an infrared transmitter attachable to a fork truck and configured to transmit an infra red signal substantially straight up;
a remote dock loading equipment controller operatively connected to the transmitter; and
a receiver mountable in proximity to a loading dock such that when mounted, the receiver will only be able to receive a signal from the transmitter when the transmitter is located with in a defined zone, the receiver configured to be operatively connected to a control panel located at the loading dock and controlling loading dock equipment.

22. The system of claim 21, further including indicia on a floor of the loading dock indicating at least of boundary of the defined zone.

23. A control system comprising:
means for transmitting attachable to a fork truck and configured to transmit a signal substantially straight up;
equipment controlling means operatively connected to the transmitting means; and
receiving means mountable with in a loading dock such that when mounted, the receiving means will only be able to receive a signal from the transmitting means when the transmitting means is located with in a defined zone, the receiving means configured to be operatively connected to a control panel located at the loading dock and controlling loading dock equipment.

* * * * *